Patented June 30, 1942

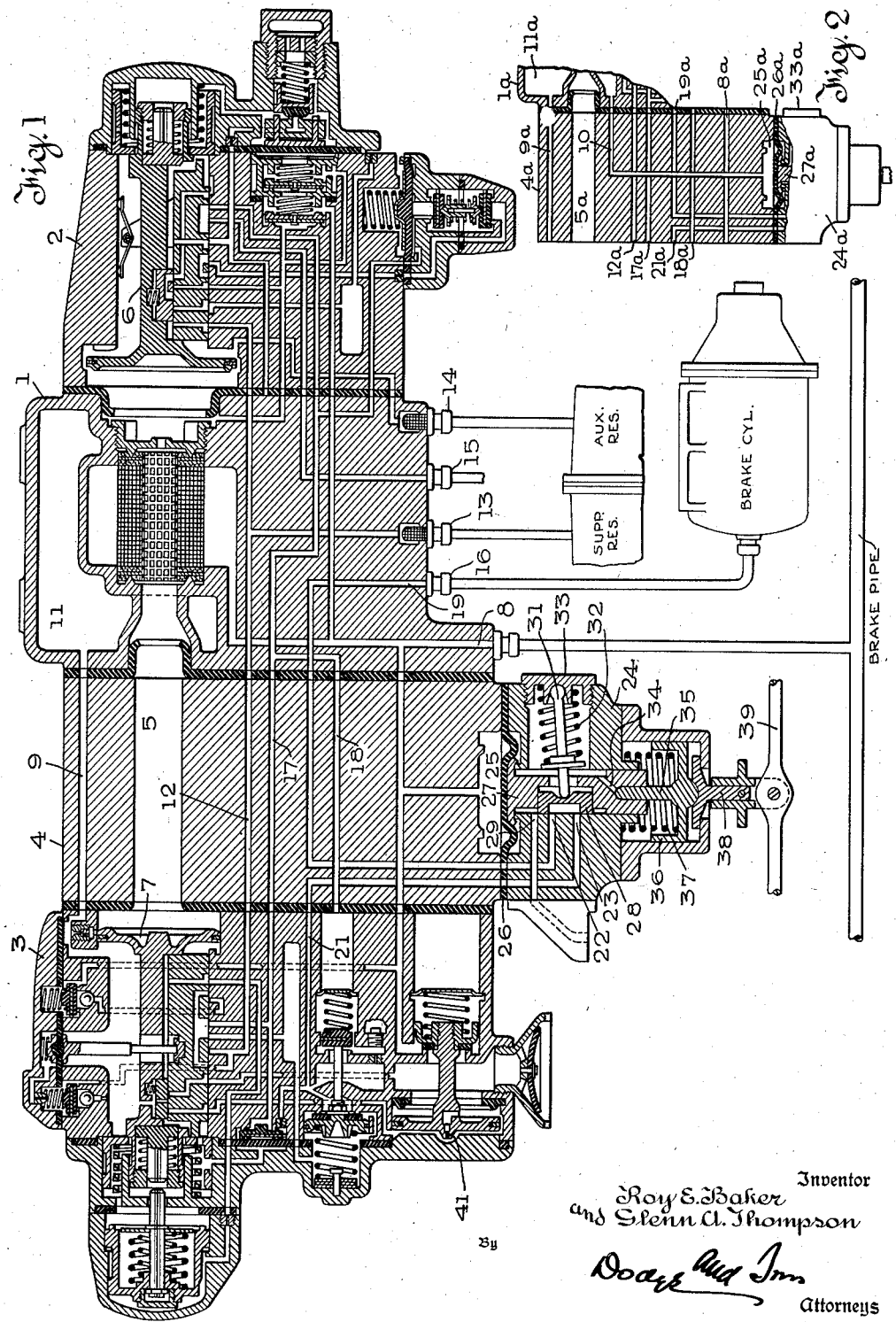

2,287,775

UNITED STATES PATENT OFFICE 2,287,775

RELEASE VALVE

Roy E. Baker and Glenn A. Thompson, Reading, Mass., assignors to The New York Air Brake Company, a corporation of New Jersey Application July 29, 1941, Serial No. 404,556

11 Claims. (Cl. 303—68)

This invention relates to air brakes and provides a releasing valve which may be operated to release the brakes on a car when the latter is cut out of a train.

When a car equipped with automatic brakes is cut out of a train its reservoirs are charged and as a consequence, when the brake pipe is vented, the brake applies, the triple valve moving to emergency position. The practice has been to release such applications by opening a bleed cock on the auxiliary reservoir. This dissipated the entire charge of air and consequently was objectionable even with single reservoir systems such as brakes equipped with K-triple valves. With multiple reservoir systems such, for example, as AB brakes, the waste of air is considerably more serious because of the large total reservoir volume. An even more important practical objection is the long time required to re-charge the reservoirs when the car is again cut into a train.

The present invention provides a simple device which can be operated manually after a car is cut out of a train, and which when operated disconnects the brake cylinder from the brake cylinder port of the triple valve or other brake controlling valve device (so that the partial reservoir charges are retained) and then immediately vents the brake cylinder to atmosphere. The device is so contrived that the vent valve remains in releasing position until the car is reconnected in a train. It follows that the brakes cannot creep on.

To secure automatic reset which is desirable, and to resist operation of the release valve except when the car is cut out of a train, the vent valve just mentioned is operatively connected with a pressure motor which is so arranged as to be under pressure when the car is connected in a train and vented when the car is cut out of a train. This motor urges the valve to its normal position in which the brake cylinder vent is closed and the brake cylinder is connected with the brake controlling valve device. The motor may be connected directly to the brake pipe passage or to a quick action chamber each of which is vented when a car is cut out.

Venting of the motor does not shift the valve, but merely permits it to be shifted against a bias which is effective when the valve is in normal position and which serves to retain the valve there.

Such embodiments will now be described by reference to the accompanying drawing in which:

Fig. 1 is a vertical axial section of an AB brake valve equipment;

Fig. 2 is a fragmentary view similar to a portion of Fig. 1 but illustrating a modification.

The illustration is diagrammatic to the extent that all ports are drawn as if they lay in a single plane, and the reservoirs and brake cylinder are indicated on a reduced scale.

Since no novelty is claimed for any portion of the AB brake proper, the mechanism is simply shown in section in release position and no attempt is made to describe either its construction or the various phases of its operation except as to those features which are directly related to the operation of the releasing valve here described.

Referring first to Fig. 1, a pipe bracket 1 is provided and to this all pipe connections are made. The bracket 1 is the standard bracket upon which the service portion 2 and an emergency portion 3 are ordinarily directly mounted. However, according to the present invention, a filler piece 4 with appropriate sealing gaskets, as shown, is interposed between the pipe bracket 1 and the emergency portion 3. Because of the diagrammatic nature of the drawing, the filler piece 4 is thicker than it need be in actual practice. Except for convenience in making the incorporation of the release valve optional, there is no reason why the filler piece 4 might not be integral with some other part of the device, such as bracket 1. Obviously a physical connection of this part with other components is a matter of design.

The filler piece 4 contains passages which form extensions of passages and chambers in the AB valve device. The passage 5 connects the spaces on the outer sides of the service piston 6 and the emergency piston 7. These passages are in free communication with the brake pipe passage 8 which has several branches, all of which will be identified by the numeral 8. The brake pipe is indicated by a legend and communicates with the passage 8. The passage 9 communicates with the quick action chamber 11 which is formed in the bracket 1. Passage 12 communicates with the supplemental reservoir connection 13. There are also an auxiliary reservoir connection 14 and an exhaust connection 15, the latter of which normally leads to the retainer (not shown) and in any event leads ultimately to atmosphere. The brake cylinder connection is shown at 16.

The passages 17 and 18 will be recognized as communicating with service and emergency ports in the valve mechanism and since they take no part in the function of the present device, no further comment need be made.

In the AB brake as used heretofore, brake cylinder connection 16 led to a pasage 19 which was in constant and direct communication with the brake cylinder passage 21 in the emergency portion. According to the present invention, the passages 19 and 21 have extensions in the filler piece 4 which do not directly communicate. On the contrary, they lead to ports 22 and 23 in a slide valve seat which is formed in a chambered casting 24 bolted to the lower face of the filler piece 4. The filler piece 4 has a chamber 25 in said lower face which is overlaid by a combined diaphragm and gasket 26.

The peripheral or gasket portion of the part 26 is clamped air-tight between the filler piece 4 and the casting 24. The central or diaphragm portion reacts against an enlarged head on the upper end of the stem 27. Stem 27 is vertically slidable in the casting 24 and is notched to receive a small slide valve 28. This valve is formed with a cavity in its seated face as clearly shown in the drawing. When the valve is in its normal, lowermost position, as illustrated, in Figure 1, the cavity just mentioned connects the passages 22 and 23. However, if the stem 27 is forced upward the valve will blank the port 23 and will connect port 22 with an exhaust port 29, also formed in the slide valve seat. In the position just mentioned, the blanking of the port 23 retains the charge in both auxiliary and supplemental reservoirs and the connection to the port 22 with the exhaust port releases the air from the brake cylinder, the air flowing by way of connection 16 and passage 19.

To hold the slide valve 28 to its seat, use is made of a toggle strut 31 which seats at one end in a cavity on the back of the slide valve and is urged toward the slide valve by a coiled compression spring 32. The spring and strut are retained by a threaded cap 33 which has a deep socket to confine the other end of the strut 31. This yielding strut acts as a toggle biasing the valve moderately toward whichever of its limiting positions it occupies.

Space around the spring 32, and around the back of the slide valve 28, is vented through a port 34 which may conveniently be formed in the stem 27. This port leads to a counterbore in the lower end of the stem. The counterbore is freely entered by the stem 35 on the guide plunger 36. This plunger 36 is urged downward by a coil compression spring 37 confined between the plunger 36 and the lower face of the casting 24.

A rocking head 38 may be tilted by pushing or pulling the rod 39 from either side of the car and when tilted forces the guide plunger 36 and the stem 27 upward, the range of motion being just sufficient to carry the slide valve 28 to the upper position above described.

When the car is connected in a train and the train is operated under normal conditions, the brake pipe is under pressure. Consequently, the diaphragm forming the lower face of chamber 25 is forced downward and holds the stem 27 in its lowermost position. The cavity in the slide valve 28 connects the ports 22 and 23. If a brake application is made, the inward travel of the service piston 6 or the inward travel of the service and emergency pistons 6 and 7 will, in ways well understood, cause delivery of compressed air to the passage 21 and consequently to the passage 19 and to the brake cylinder.

The brakes can be released by reverse flow through the same course when pressure in the brake pipe is restored and the pistons 6 or 6 and 7 resume their normal release positions.

If a car equipped with the present invention is cut out of a train, the venting of the brake pipe causes both pistons 6 and 7 to move to emergency position. This connects both the auxiliary and supplemental reservoirs with passage 21. If then it be desired to move the car, the brakes may be released by pulling or pushing the rod 39. At this time the chamber 25 will be vented and the effect of moving the rod 39 will be to move the stem 27 to its uppermost limit, venting the brake cylinder and confining the air charges in the supplemental and auxiliary reservoirs.

The brakes will not again apply until the car is reconnected in a charged train. When it is so reconnected the reestablishment of pressure in the chamber 25 will restore the slide valve 28 to its lower normal position and eventually cause the pistons 6 and 7 to resume their normal release positions.

*Modification—Fig. 2*

In Fig. 2 parts identical with those in Fig. 1 are given the same reference numerals with the letter *a*. The chamber 25a is not connected with the brake pipe passage 8a but instead is connected by passage 10 with quick action chamber 11a. This chamber is vented through the timing port in the emergency brake pipe vent piston (see part 41 in Fig. 1) as an incident to an emergency application. Hence chamber 11a will be at atmospheric pressure shortly after a car is cut out, and as is well known it will be recharged shortly after development of brake pipe pressure commences.

The time delay intervals imposed on the freeing of the vent valve for venting manipulation and on its automatic restoration are not important.

The invention permits quicker release of the brake on the car than can be had by bleeding the reservoirs, and it avoids waste. But more important still, the invention reduces the time required for re-charging the reservoirs when the car is again connected in a charged train.

The device is not intended for use in causing a stuck triple to remove to release position and cannot be used for that purpose. However, the use of the invention does not preclude the use of any of the means known in the art for accomplishing the end just stated.

What is claimed is:

1. The combination of a brake controlling valve device of the automatic type having a brake cylinder connection with communicating passage through which actuating air flows to and from the brake cylinder connection; a releasing valve controlling the brake cylinder passage and having a normal position in which the passage is open, and an abnormal position in which the passage is closed and the brake cylinder connection is vented; manually operable means for shifting the releasing valve to said abnormal position; and restoring means normally effective to shift said releasing valve to, and to maintain it in, said normal position.

2. The combination of a brake controlling valve device of the automatic type having a brake cylinder connection with communicating passage through which actuating air flows to and from the brake cylinder connection; a releasing valve controlling the brake cylinder passage and having a normal position in which the passage is open, and an abnormal position in which the passage is closed and the brake cylinder connection is vented; manually operable means for shifting the releasing valve to said abnormal position; restoring means normally effective to shift said releasing valve to, and to maintain it in, said normal position; and means rendered effective by venting the brake pipe to suspend the action of said restoring means.

3. The combination of a brake controlling valve device of the automatic type, having a brake pipe passage which is normally charged and through which control of the device is exercised and having a brake cylinder connection with communicating passage through which actuating air flows to and from the brake cylinder connection; a releasing valve controlling the brake cylinder passage and having a normal position in which the passage is open, and an abnormal position in which the passage is closed and the brake cylinder connection is vented; manually operable means for shifting the releasing valve to said abnormal position; loading means normally effective to bias said releasing valve to said normal position; and means rendered effective by venting of the brake pipe passage to disable said loading means without shifting said releasing valve.

4. The combination of a brake controlling valve device of the automatic type, having a brake pipe passage which is normally charged and through which control of the device is exercised and having a brake cylinder connection with communicating passage through which actuating air flows to and from the brake cylinder connection; a releasing valve controlling the brake cylinder passage and having a normal position in which the passage is open, and an abnormal position in which the passage is closed and the brake cylinder connection is vented; manually operable means for shifting the releasing valve to said abnormal position; and restoring means rendered effective by charging of said brake pipe to restore said releasing valve to said normal position.

5. The combination of a brake controlling valve device of the automatic type, having a brake pipe passage which is normally charged and through which control of the device is exercised and having a brake cylinder connection with communicating passage through which actuating air flows to and from the brake cylinder connection; a releasing valve controlling the brake cylinder passage and having a normal position in which the passage is open, and an abnormal position in which the passage is closed and the brake cylinder connection is vented; means responsive to pressure in the brake pipe passage for urging the releasing valve to said normal position; and manually controlled means for shifting the releasing valve to said abnormal position.

6. The combination of a brake controlling valve device of the automatic type capable of assuming an emergency position, said device having a brake pipe passage which is normally charged and through which control of the device is exercised, and a brake cylinder connection with communicating passage through which actuating air flows to and from the brake cylinder connection; a releasing valve controlling the brake cylinder passage, and having a normal position in which said passage is open and an abnormal position in which said passage is closed and the brake cylinder connection is vented; means manually operable, at least when the valve device is in emergency position, to shift said releasing valve to said abnormal position; and restoring means rendered effective by charging of the brake pipe passage after an emergency reduction of pressure therein.

7. The combination of a brake controlling valve device of the automatic type, said device having a brake pipe passage which is normally charged and through which control of the device is exercised, and a brake cylinder connection with communicating passage through which actuating air flows to and from the brake cylinder connection; a releasing valve controlling the brake cylinder passage, and having a normal position in which said passage is open and an abnormal position in which said passage is closed and the brake cylinder connection is vented; fluid pressure motor means subject to pressure in said brake pipe passage and so arranged that development of pressure in that passage serves to shift said releasing valve to said normal position; manually operable means for shifting said releasing valve to said abnormal position; and a reversible biasing means arranged to exert an impositive retaining tendency on said releasing valve in each of said positions.

8. The combination defined in claim 7 in which the releasing valve is of the slide type and the reversible biasing means is a spring urged toggle strut arranged to react upon said valve in a direction to hold the valve seated.

9. A brake equipment comprising in combination a brake pipe; a brake controlling valve device controlled thereby; local reservoir means and a brake cylinder each connected with said valve device; a vent valve having a normal position in which it connects the brake cylinder in normal relationship to the other components named, and an abnormal position to which it may be manually moved and in which it isolates and vents said brake cylinder; and a pressure motor arranged to be subject to pressure when the brake pipe is charged and when under pressure serving to cause shifting of said vent valve to said normal position.

10. The combination of a normally charged brake pipe; a brake controlling valve device of the automatic type; reservoir means charged through said valve device and comprising at least one reservoir; a brake cylinder operable under control of the valve device by air derived from said reservoir means; a vent valve having an inactive normal position and manually movable from said normal position to an abnormal position in which it conserves the charges in said reservoir means and vents the brake cylinder; and a pressure motor rendered effective by charging of the brake pipe to bias said vent valve toward its normal position.

11. The combination of a normally charged brake pipe; a brake controlling valve device of the automatic type; a brake cylinder; reservoir means associated with said valve device; vent valve means having a normal position in which the normal relationships of the reservoir means, brake controlling valve device, and brake cylinder subsist, and an abnormal position in which the reservoir means are isolated at least from the brake cylinder and the brake cylinder is vented to atmosphere independently of the brake controlling valve device; and pressure operated means rendered effective by charging of the brake pipe and then serving to retain said vent valve means in its normal position.

ROY E. BAKER.
GLENN A. THOMPSON.

Disclaimer 2,287,775.—*Roy E. Baker* and *Glenn A. Thompson*, Reading, Mass. RELEASE VALVE.
Patent dated June 30, 1942. Disclaimer filed May 18, 1950, by the assignee,
*The New York Air Brake Company*.

Hereby enters this disclaimer to claims 1 to 6 inclusive and claims 9 to 11 inclusive of said patent.

[*Official Gazette June 20, 1950.*]